United States Patent [19]
Lyall

[11] 4,188,984
[45] Feb. 19, 1980

[54] BABY-MILK POWDER DISPENSER
[76] Inventor: Rodney Lyall, 42 Emerson Ave. Linthorpe, Middlesbrough,, Cleveland, England
[21] Appl. No.: 928,518
[22] Filed: Jul. 27, 1978
[30] Foreign Application Priority Data
Aug. 16, 1978 [GB] United Kingdom ............ 34363/77
[51] Int. Cl.² ............................................. B65B 1/04
[52] U.S. Cl. ...................................... 141/12; 222/38
[58] Field of Search .................. 141/94, 95, 96, 249, 141/71-81, 12, 18-28, 2; 222/38; 221/7

[56] References Cited
U.S. PATENT DOCUMENTS

| | | | |
|---|---|---|---|
| 2,400,328 | 5/1946 | Zehring | 222/38 |
| 2,946,486 | 7/1960 | Gilmont | 222/38 |
| 4,116,247 | 9/1978 | Zanasi | 141/81 |

*Primary Examiner*—Houston S. Bell
*Attorney, Agent, or Firm*—Harold D. Jones, Jr.

[57] ABSTRACT

A method of dispensing baby milk powder which comprises compacting the powder to its maximum extent in a measuring chamber, which comprises a tubular member housing a plunger so that the chamber is defined between the plunger and an open end of the tubular member, and actuating the plunger to dispense the measured contents, and a dispenser for carrying out the method and being designed to indicate when maximum compaction of the baby milk powder in the measuring chamber is achieved.

12 Claims, 7 Drawing Figures

BABY-MILK POWDER DISPENSER

This invention is concerned with a method of dispensing a predetermined quantity of baby-milk powder and with a dispenser suitable for use in this method.

By the term "baby-milk powder" is meant a milk product suitable for babies in the form of a non free-flowing powder which compacts under light pressure, in contradistinction to free-flowing solid milk products, such as granular products, which do not compact under light pressure. Commercially available baby-milk powders are usually based on cow's milk solids and contain, inter alia, protein, carbohydrate and fat. The fat content of such products is generally 15–35% w/w and often 20–30% w/w. The particle size of such products is generally below 250 microns, more usually below 180 microns and often below 130 microns.

Baby-milk powder is usually measured by volume for mixing with a given volume of water to provide reconstituted milk of a desired concentration. If the reconstituted milk is too dilute, under-nourishment of the infant can occur. If the reconstituted milk is too concentrated, over-nourishment of the infant can occur leading to undesirable obesity, but a greater danger is the development of hypernatraemia due to an excessive administration of solute in relation to fluid intake. The usual method of measuring baby-milk powder, by means of a scoop, is liable to inaccuracies and is thus inadequate. These inaccuracies arise because the scoop is liable to be used incorrectly, eg heaped with powder instead of filled level with the top of the scoop, and also because the actual quantity of powder varies according to the degree of compaction of the powder in the scoop. The present invention provides a method of dispensing a measured quantity of baby-milk powder that is more reliably accurate than the usual method involving a scoop.

The present invention provides a method of dispensing a measured quantity of baby-milk powder as hereinbefore defined comprising inserting into the powder an end of a tubular member housing a plunger which is either retracted away from the end of the tubular member to a given position defining with the tubular member an open-ended measuring chamber or is retractable to said given position by pressure from the powder as the tubular member is inserted, the end of the tubular member being inserted into the powder to a depth greater than the length of the measuring chamber and sufficient to compact the powder in the tubular member and against the plunger to substantially maximum compaction, withdrawing the tubular member from the powder so that a measured quantity of compacted powder is contained in the measuring chamber and actuating the plunger to dispense the powder from the tubular member.

The minimum depth of insertion of the tubular member in the powder necessary to achieve substantially maximum compaction of the powder depends on the degree of compaction of the baby-milk powder in its container. For example, if the powder in the container is compacted under its own weight or by means of slight downwards pressure on the surface of the powder, a depth of about 1.5 times the length of the measuring chamber is generally sufficient. However, it is preferred to use a depth of at least twice the length of the measuring chamber in order to achieve satisfactory results with the various degrees of compaction that are met with in practice. The tubular member is preferably cylindrical.

The invention also resides in a dispenser capable of use in dispensing a measured quantity of baby-milk powder (as hereinbefore defined), the dispenser comprising a tubular member having an open end and slidably housing a plunger for movement between the open end and a position of maximum retraction of the plunger in the tubular member away from said open end, a measuring chamber being defined between said open end and the plunger in said retracted position, and means determining the minimum extent of insertion of the open end of the tubular member into the powder to achieve substantially maximum compaction of powder in the measuring chamber, and actuating means for actuating the plunger to dispense the powder from the measuring chamber. Said means determining the minimum extent of insertion preferably determines the insertion to at least twice the length of the measuring chamber between the plunger in said retracted position and said open end.

The means determining the minimum extent of insertion may be a marker on the tubular member and, in one example, is an external flange on the tubular member.

In another embodiment, the means determining the minimum extent of insertion is resilient means acting on the plunger to urge the latter in the dispensing direction and a releasable detent for latching the plunger in said retracted position.

The detent may effect latching by engagement with a ratchet which is angularly movable to release the detent. The ratchet may be connected with a numbered wheel which, together with a relatively fixed marker, defines a counter for counting dispensing operations.

Where the means determining the minimum extent of insertion is a marker, the plunger may be resiliently biased into the retracted position, the actuating means being means connected to the plunger for moving the plunger against said resilient bias. A counter may be provided for actuation by said actuating means for counting dispensing operations.

The tubular member may be adjustably mounted to vary the length of the measuring chamber between the plunger and the open end of the tubular member.

From another aspect, the invention resides in a dispenser capable of use in dispensing a measured quantity of baby-milk powder (as hereinbefore defined), the dispenser comprising a tubular member having an open end and slidably housing a plunger for movement between the open end and a position of maximum retraction of the plunger in the tubular member away from the open end, a measuring chamber being defined between said open end and the plunger in said retracted position, so that insertion of the open end of the tubular member in the powder compacts the latter against the plunger in the measuring chamber, actuating means for actuating the plunger to dispense the powder from the measuring chamber, and a counter actuable by movement associated with the dispensing operation to count the dispensing operations. This counter may also be incorporated in the hereinbefore described dispenser.

Reference is now made to the accompanying drawings, wherein.

Figure 2:
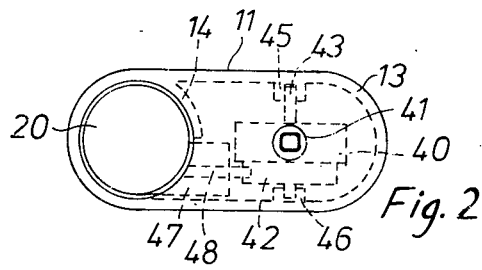
FIG. 2 is a plan view of the dispenser of FIG. 1.
Figure 1:
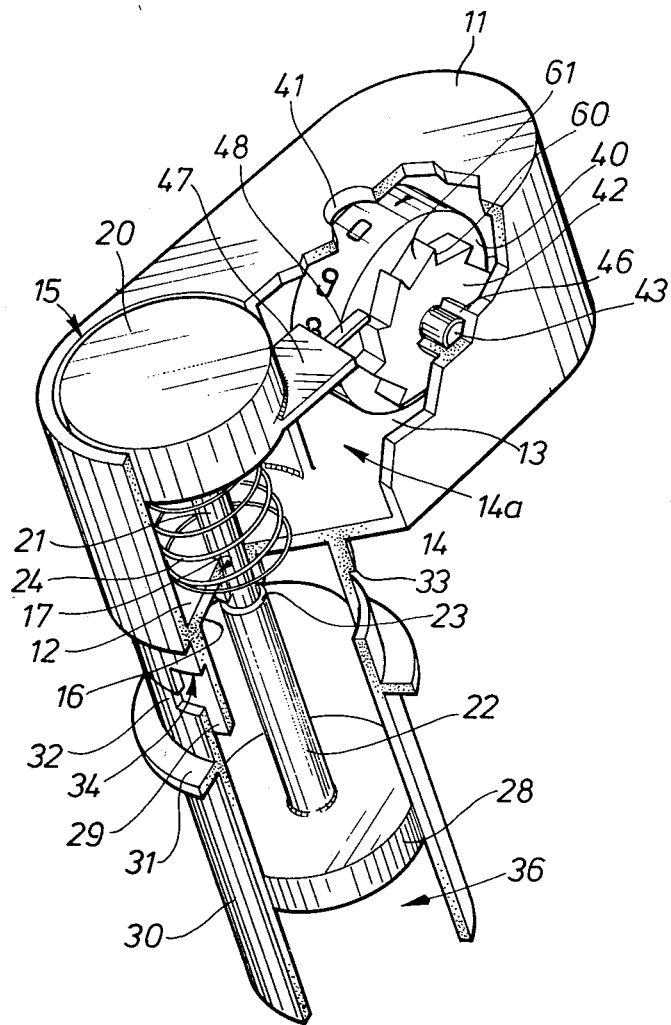
FIG. 1 is a perspective view of a first embodiment of a dispenser according to the invention with its housing partly broken away.

Referring to FIGS. 1 and 2, the dispenser shown comprises a housing 11 including first and second compartments 12, 13. The first compartment 12 is of cylindrical form and has an axial slot 14a in a wall portion 14 between the two compartments. One end 15 of the first compartment 12 is open and the other end 16 is closed except for an aperture 17 which extends through an annular strengthening flange 18 externally of the first compartment. An actuating piston 20 is slidably housed in the first compartment and a piston rod 21, fixed to the piston 20, extends through the aperture 17. The piston rod 21 is co-axially secured to a plunger stem 22 defining an annular shoulder 23 adjacent the piston rod 21. A helical compression spring 24 surrounds the piston rod 21, in the first compartment 12, and acts on the wall at the closed end 16 of the compartment and on the piston 20, urging the piston to the position illustrated, in which the external face of the piston is flush with the external wall of the first compartment at the open end 15. This position is determined by abutment of the shoulder 23 with the annular flange 18.

The plunger stem 22 is provided with a plunger head 28. An annular boss 29 is formed integrally with the housing 11 and co-axially surrounds the flange 18 and a portion of the plunger stem 22. A sleeve 30 is engaged with the boss and the plunger head 28 is a close sliding fit in the sleeve. The sleeve has an outwardly extending external marker flange 31, whose purpose is described hereafter.

The boss 29 is formed with a series of steps spaced angularly around the boss, two such steps 33, 34 being shown in FIG. 1. The sleeve is a tight fit on the boss and is formed with a single contiguous projection 32, which can be pushed into engagement with any selected one of the steps on the boss 29. By this means, the length of the sleeve projecting beyond the plunger head 28 is adjustable. This projecting portion of the sleeve, together with the plunger head 28, in the spring-biased position illustrated, defines a measuring chamber 36. The adjustment of the projection of the sleeve, therefore, is an adjustment of the volume of the measuring chamber 36. In practice, the steps will be marked as an indication of the corresponding volume of the measuring chamber 36.

In use, the sleeve 30 is inserted into a mass of milk powder, at least until the marker flange 31 touches the powder surface. Whatever the adjustment position of the sleeve 30, this means that the sleeve 30 will have been inserted in the powder to a depth of twice the depth of the measuring chamber 36, or more. This ensures maximum compression of the milk powder in the measuring chamber. The nature of the powder is such that a "plug" is formed in the measuring chamber and this remains in the chamber, when the dispenser is withdrawn from the milk powder, and fills the chamber. Any excess powder is scraped away so that the "plug" is level with the free end of the sleeve. This "plug," therefore, although measured by volume, is of a predetermined weight. This "plug" is ejected from the measuring chamber into a vessel by pressing the actuating piston 20, against the bias of the spring 24 for its maximum travel. This moves the plunger head 28 sufficiently to eject all of the powder in the measuring chamber. To ensure that there are no cavities in the powder in the container into which the dispenser is to be inserted, the container is preferably shaken or tapped on a surface to cause settlement.

To make up a baby feed, the quantity of milk powder to be used varies according to the age of the baby, so that varying multiples of the predetermined measure have to be used. A counter is provided as a record of the number of measures taken.

The second compartment 13 houses the counter, which, in this case, comprises a single wheel 40 provided with numbers 0 to 9 on its periphery. A window 41 is provided to show any one of these numbers when the number is adjacent the window. The number "4," for example, is showing through the window in FIG. 2. The wheel has an integral ratchet 42 and shaft 43. The ratchet has teeth each formed with an engagement surface 60 opposite to a cam surface 61. The shaft is journalled in bosses 45, 46 in the housing 11, which provide frictional resistance to rotation of the wheel 40.

The actuating piston 20 is formed with a bearing surface 47, projecting into the second compartment 13, and with a resilient finger 48, which extends below the bearing surface 47 to a position where it is within the circumference of the ratchet 42.

On depression of the actuating piston 20 the finger 48 is caused to engage with the engagement surface 60 of a tooth of the ratchet 42 and angularly moves the ratchet through a predetermined angle to cause the wheel 40 to show, at the window 41, the next number in the sequence. The finger is rigidified by bearing on the bearing surface 47, to overcome the frictional resistance to rotation. On return of the actuating piston 20, under spring bias, the finger slides over the cam surface 61 of a tooth of the ratchet, the finger flexing, since there is no bearing surface to support the finger. The reading at the window 41 is not, therefore, upset.

The counter can be reset to "0" by repeated depression of the actuating piston 20, but other means may be provided for effecting resetting.

Figure 3:
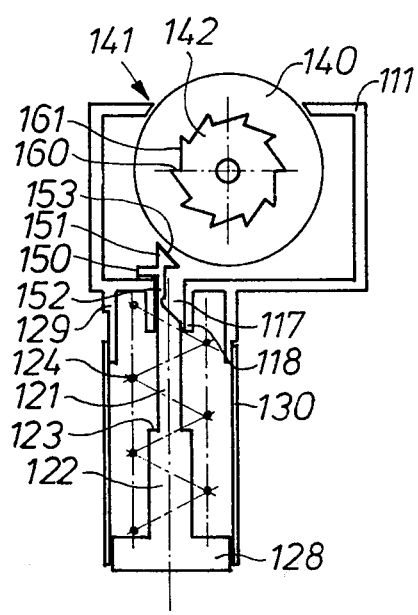
FIG. 3 is a diagrammatic sectional view of a second dispenser shown in a position ready for insertion in a powder.
Figure 4:
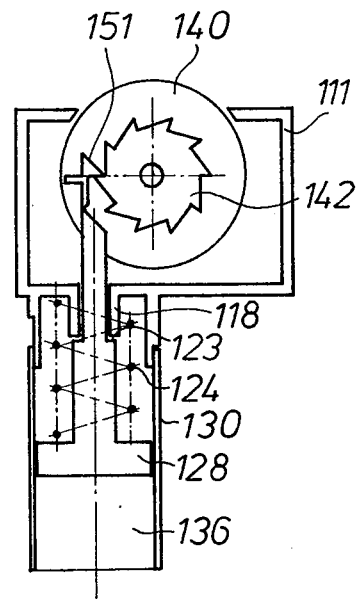
FIG. 4 is a view similar to that of FIG. 3 with the second dispenser shown in a position ready for dispensing powder.
Figure 5:
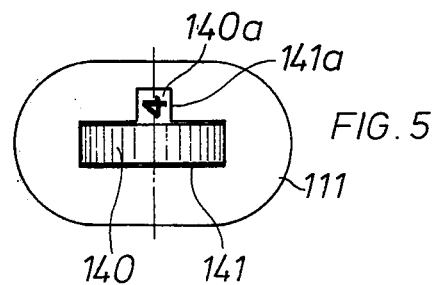
FIG. 5 is a plan view of the second dispenser.

A further embodiment is illustrated in FIGS. 3 to 5. This embodiment has a housing 111 formed with an aperture 117 extending through an annular flange 118 and also formed with an annular stepped boss in a similar manner to the embodiment shown in FIGS. 1 and 2. A sleeve 130 is again engaged with the boss 129 and defines a measuring chamber 136 with a plunger head 128 (FIG. 4).

In this case, however, the cylindrical first compartment with the actuating piston is omitted and the housing 111 defines a single compartment housing a counter wheel 140, similar to that shown in FIGS. 1 and 2. The wheel 140 is again formed with a ratchet 142, having teeth with an engagemetn surface 160 and a cam surface 161, and is also formed with a shaft 143 mounted with frictional resistance against rotation of the wheel. The housing 111 has a window 141, through which a portion of the wheel 140 projects, the periphery of the wheel being knurled to facilitate manual rotation against the frictional resistance. The wheel has a part 140a of smaller diameter on the opposite side to the ratchet 142, this part only being visible in FIG. 5, where it is shown provided with the numeral "4" of a series of numbers from 0 to 9. The numeral is visible through a side portion 141a of the window 141.

The plunger head 128 is again formed on a plunger 122, which has a reduced diameter portion 121, defining a shoulder 123 and projecting into the housing 111 through the aperture 117. Within the housing, the stem portion 121 is provided with a stop 150 and, beyond the stop, with a detent 151. The detent is defined by a cutaway portion leaving a neck 152 to provide for flexibility of the detent radially of the stem axis. The detent also has a cam face 153.

A compression spring 124 is housed in the sleeve 130 between the plunger head 128 and the housing portion lying between the annular flange 118 and the stepped boss 129. The spring urges the plunger head 128 to the position shown in FIG. 3, in which the plunger head just projects beyond the end of the sleeve, so that the measuring chamber 136 volume is reduced to nil. This position is determined by the stop 150 engaging the interior of the housing 111. The shoulder 123 determines the depth of the chamber 136, as can be seen from FIG. 4.

In use, the sleeve 130 is again inserted in a mass of milk powder to a depth of at least twice the depth of the measuring chamber 136, providing maximum compression of the milk powder. The pressure exerted on the plunger head 128 is sufficient to overcome the bias of the spring 124 and the plunger head is retracted to the full, as determined by the shoulder 123. As the plunger stem portion 121 is raised, the cam face 153 of the detent engages the cam surface 161 of a tooth of the ratchet 142 and the detent is cammed out of axial alignment with the stem through flexibility at the neck 152. As the cam surface 153 of the detent passes the cam surface 161 of the tooth, the detent is resiliently returned to the axially aligned position and engages with the engagement surface 160 of the tooth. The frictional resistance against rotation of the wheel 140 causes the ratchet, therefore, to hold the plunger head 128 in its fully retracted position. A "plug" of milk powder is held in the measuring chamber as in the previously described embodiment. Release of the "plug" of milk powder is effected by manually turning the wheel 140 anti-clockwise, as seen in FIG. 4, against the frictional resistance, so that the detent 151 is released and the spring 124 causes the plunger head 128 to eject the "plug." This turning of the wheel causes the next numeral in sequence to show at the window portion 141a.

If the powder is not compacted to its maximum extent due to the dispenser not being inserted sufficiently deeply into the powder, then the plunger head 128 will not be sufficiently retracted for the detent 151 to engage with the ratchet 142. This is because the spring 124 determines that maximum compaction is achieved by resisting movement of the plunger head. Any powder in the chamber 136 will, therefore, immediately be ejected as the dispenser is being withdrawn from the milk powder.

In each of the two embodiments described above, the projection (32 in FIG. 1) on the sleeve 30, 130 can be omitted and the steps (33, 34 in FIG. 1) on the boss 29, 129 can be replaced by a single stop shoulder, so that there is no provision for adjustment of the position of the sleeve on the boss. If desired a plurality of replaceable sleeves of different lengths can be provided instead.

Figure 6:
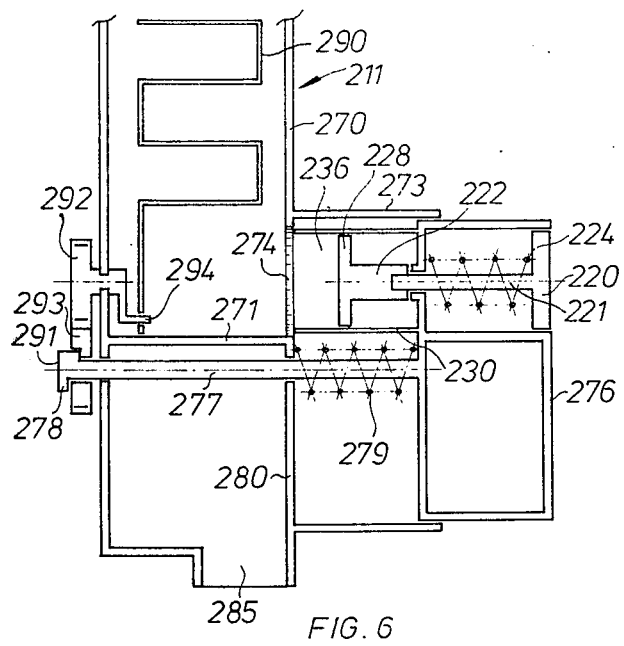
FIG. 6 is a sectional view of a third dispenser.
Figure 7:
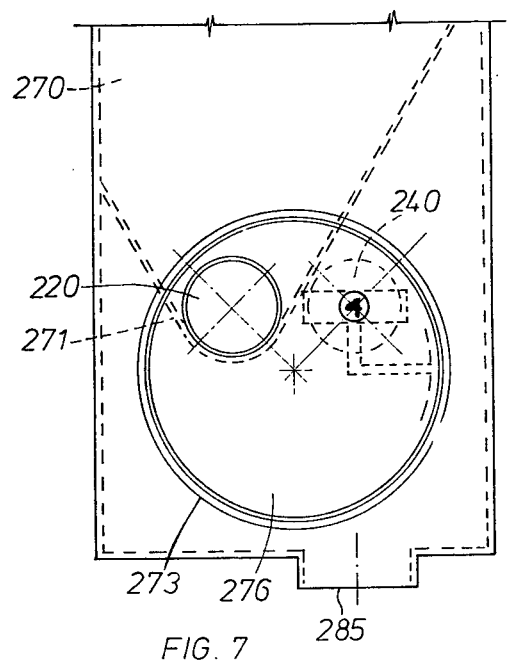
FIG. 7 is a front elevation of the third dispenser.

Referring now to FIGS. 6 and 7, a dispenser is shown, which may be wall-mounted, in use. This dispenser comprises a housing 211 including a hopper 270, for containing milk powder, having a concave base 271. The housing is formed with a projecting cylinder 273 and a circular aperture 274, in the housing wall, communicates the cylinder interior with the bottom of the hopper 270.

An operating member 276 is slidably engaged in the cylinder 273 and is formed with a co-axial extension rod 277 having a head 278 determining the maximum retracted position of the operating member. The member is urged to this position by a spring 279 mounted about the rod 277 between the member 276 and a wall 280 of the housing. The member is rotatable with the rod serving as a shaft.

The member is provided with a sleeve 230, which, in the position shown in the drawings, is aligned with the aperture 274. Hence, on depression of the member 276 against the bias of the spring 279, the sleeve is moved into the bottom of the hopper 270. The maximum extent of depression of the member is determined by the member abutting the wall 280.

The member 276 is provided with a dispensing part similar to that described with respect to FIGS. 1 and 2. The sleeve 230 houses a plunger head 228 and plunger stem 222, co-axially secured to a piston rod 221 and an actuating piston 220. A spring 224 urges the plunger head 228 to a retracted position (as shown) to define a measuring chamber 236.

In use, the member 276 is depressed to its maximum extent, so that the measuring chamber 236 is forced into milk powder in the hopper 270 to a predetermined depth of approximately twice the depth of the chamber. A "plug" of powder is, therefore, held in the chamber 236, when the member 276 is released and retracts. The member is then turned, so that the measuring chamber is positioned adjacent a dispensing aperture 285. As the member is turned, excess powder is scraped from the surface, the end of the sleeve co-operating with the wall 280 of the housing. The actuating piston 220 is depressed to eject the "plug" of milk powder from the chamber 236 into a vessel and the member is returned to its original position for a repeat operation.

A counter 240, similar to that shown in FIGS. 1 and 2, is again provided. The counter can be operated in the same manner, either as the piston 220 is depressed, or by the rotation of the member 276.

An agitator 290 is provided in the hopper and is oscillated in an up and down motion by a crank 294. The crank is driven by turning of the member 276 in a dispensing operation through gears 292, 293 operated by a cam 291 on the end of the rod 277.

In each of the described dispensers, the sleeve defining the measuring chamber may be a tubular member of any desired cross-sectional form and the sleeve may be fluted to increase the surface area in contact with the powder, in use, to improve the retention of powder in the measuring chamber. The plunger head would of course, by shaped complementarily to the sleeve.

I claim:

1. A method of dispensing a measured quantity of baby-milk powder (as hereinbefore defined) comprising the steps of inserting into the powder an end of a tubular member housing a plunger which is capable of being retracted away from the end of the tubular member to a given position defining with the tubular member an open-ended measuring chamber, inserting the end of the tubular member into the powder to a depth greater than the length of the measuring chamber and sufficient to compact the powder in the tubular member and against the plunger to substantially maximum compaction, withdrawing the tubular member from the powder so that a measured quantity of compacted powder is contained in the measuring chamber and actuating the plunger to dispense the powder from the tubular member.

2. A method according to claim 1, wherein the tubular member is inserted in the powder to a depth at least twice the length of the measuring chamber.

3. A dispenser for use in dispensing a measured quantity of baby-milk powder of the type described comprising a tubular member defining an opening at one end, operable means including a plunger closely slidably fitted in the tubular member for movement between said opening and a position of maximum retraction of the plunger in the tubular member away from said opening, stop means engageable by said operable means to determine said position of maximum retraction of the plunger, spring means biasing said operable means into engagement with said stop means, a measuring chamber defined by said tubular member and said opening and said plunger when said plunger is in its retracted position, said opening having the same dimensions as the internal cross-sectional dimensions of the measuring chamber, marking means located externally on the tubular member and spaced further from said opening than said plunger when said plunger is in its position of maximum retraction, the location of said marking means being such that insertion of the tubular member in a mass of baby-milk powder to the depth of the marking means compacts such powder to substantially its maximum extent in the measuring chamber agains the plunger and manually depressable actuating means connected with the plunger for moving the latter against the bias of said spring means to dispense the compacted powder from the measuring chamber.

4. A dispenser according to claim 3, wherein the space between said marking means and said opening is at least twice the length of the measuring chamber between the plunger in its position of maximum retraction and said opening.

5. A dispenser according to claim 4, wherein said marker comprises an external flange extending about the tubular member.

6. A dispenser according to claim 3, incorporating a counter operable by actuation of the actuating means to count the number of dispensing operations.

7. A dispenser according to claim 6, wherein the tubular member is adjustable in position to vary the length of the measuring chamber.

8. A dispenser according to claim 3 comprising a plurality of tubular members of different lengths, interchangeable with one another about said plunger to vary the length of the measuring chamber.

9. A dispenser for use in dispensing a measured quantity of baby-milk powder of the type described comprising a tubular member defining an opening at one end, operable means including a plunger closely slidably fitted in the tubular member for movement between said opening and a position of maximum retraction of the plunger in the tubular member away from said opening, said opening having the same dimensions as the internal cross-sectional dimensions of the measuring chamber, first stop means engageable by said operable means to determine said position of maximum retraction of the plunger, spring means biasing said operable means towards said opening, second stop means engageable by said operable means under the bias of said spring means to position said plunger in said opening, whereby insertion of the tubular member in baby-milk powder causes compacting of the powder against the plunger and movement of the plunger against the bias of said spring means, said first stop means being located in a position such that substantially maximum compaction of the powder is achieved in the measuring chamber when the operating means engages the first stop means, releasable detent means for latching the operating means in said position of maximum retraction of the plunger, and actuating means for releasing the detent means to permit dispensing of powder from the measuring chamber by said plunger under the bias of said spring means.

10. A dispenser according to claim 9, wherein the detent means effects latching by engaging with a ratchet and the ratchet is rotatable to release the operating means for movement in the dispensing direction by said spring means.

11. A dispenser according to claim 10, wherein the ratchet is connected with a numbered wheel which, together with a marker, defines a counter for counting dispensing operations.

12. A dispenser according to claim 9, including a housing incorporating a hopper for baby-milk powder, the tubular member being mounted on a carrier which is movable to urge the tubular member to extend into the hopper, the carrier being rotatable to position the tubular member in dispensing alignment with a dispensing aperture in the housing.

* * * * *